(12) United States Patent
Nishikawa et al.

(10) Patent No.: US 11,535,093 B2
(45) Date of Patent: Dec. 27, 2022

(54) AUTOMOTIVE DOOR SEALING MEMBER

(71) Applicant: Nishikawa Rubber Co., Ltd., Hiroshima (JP)

(72) Inventors: Shinji Nishikawa, Hiroshima (JP); Satoshi Maesaki, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 17/193,270

(22) Filed: Mar. 5, 2021

(65) Prior Publication Data

US 2021/0331568 A1   Oct. 28, 2021

(30) Foreign Application Priority Data

Apr. 23, 2020   (JP) .............................. JP2020-076554

(51) Int. Cl.
*B60J 10/00* (2016.01)
*B60J 10/86* (2016.01)
*B60J 10/24* (2016.01)

(52) U.S. Cl.
CPC ............... *B60J 10/86* (2016.02); *B60J 10/24* (2016.02)

(58) Field of Classification Search
CPC ............. B60J 10/86; B60J 10/21; B60J 10/22
See application file for complete search history.

(56) References Cited

U.S. PATENT DOCUMENTS

2017/0028829 A1*  2/2017  Okino ....................... E06B 7/23
2017/0274750 A1*  9/2017  Sobue .................... F16J 15/027

FOREIGN PATENT DOCUMENTS

| JP | H09-240278 A | 9/1997 |
| JP | H10-076847 A | 3/1998 |
| JP | 2005-280410 A | 10/2005 |
| JP | 2005280410 A | * 10/2005 |

* cited by examiner

*Primary Examiner* — Daniel J Troy
*Assistant Examiner* — Daniel Alvarez
(74) *Attorney, Agent, or Firm* — Renner, Otto, Boisselle & Sklar, LLP (57) ABSTRACT

Sealing performance is improved without deteriorating appearance. A pillar P side of a roof-side seal lip 34 and a roof R side of a pillar-side seal lip 43 are spaced apart from each other in a transverse direction of a vehicle when a door 110 is open. The pillar P side of the roof-side seal lip 34 is formed so as to be closer to the roof R side of the pillar-side seal lip 43 toward an end of the pillar P side. When the door 110 is closed, the roof-side seal lip 34 comes into contact with the pillar-side seal lip 43.

6 Claims, 7 Drawing Sheets

AUTOMOTIVE DOOR SEALING MEMBER

CROSS-REFERENCE TO RELATED APPLICATION

This application claims priority to Japanese Patent Application No. 2020-076554 filed on Apr. 23, 2020, the entire disclosure of which is incorporated by reference herein.

BACKGROUND

The present disclosure relates to an automotive door sealing member that seals the gap between a vehicle body and a door attached to a side of an automobile, for example.

Doors attached to the sides of an automobile has an automotive door sealing member for sealing the gaps between the doors and a panel of the vehicle body (see, e.g., Japanese Unexamined Patent Publication No. 2005-280410 and Japanese Unexamined Patent Publication No. H9-240278). The sealing member according to Japanese Unexamined Patent Publication No. 2005-280410 is located at a peripheral edge of a door, and includes a pillar-side part extending in a vertical direction along the peripheral edge of the door and a roof-side part extending in the front-rear direction of the vehicle along the upper side of a window frame. The pillar-side part includes a pillar-side base attached to the door and a pillar-side seal wall integral with the pillar-side base. Similarly, the roof-side part includes a roof-side base attached to the door and a roof-side seal wall integral with the roof-side base.

According to Japanese Unexamined Patent Publication No. 2005-280410, when the door is closed, the pillar-side part and the roof-side part of the sealing member deform differently. Specifically, as shown in FIGS. 1 and 5 of Japanese Unexamined Patent Publication No. 2005-280410, at the upper end corner of the front side (i.e., the hinge side) of a rear door, when the door is closed, the pillar-side part of the sealing member is pressed in the front-rear direction of the vehicle by the pillar of the vehicle body, so that the pillar-side seal wall deforms to bend in the front-rear direction of the vehicle. On the other hand, when the door is closed, the roof-side part is pressed in the transverse direction of the vehicle by the roof of the vehicle body, so that the roof-side seal wall deforms to be squashed in the transverse direction of the vehicle.

According to Japanese Unexamined Patent Publication No. H9-240278, each of the pillar-side part and the roof-side part has a seal lip. When the door is closed, the seal lip of the pillar-side part comes into elastic contact with the pillar of the vehicle body and exhibits sealing performance. When the door is closed, the seal lip of the roof-side part comes into elastic contact with the roof of the vehicle body and exhibits sealing performance. According to Japanese Unexamined Patent Publication No. H9-240278, the seal lip of the pillar-side part and the seal lip of the roof-side part are spaced apart from each other in the transverse direction of the vehicle with a water passage interposed therebetween. A blocking wall that blocks the water passage is provided so as to extend from the seal lip of the pillar-side part to the seal lip of the roof-side part.

On the other hand, Japanese Unexamined Patent Publication No. H10-076847 describes the following phenomenon as shown in FIG. 8. That is, at the roof, water that has entered the contact between an opening edge of a vehicle body and a hollow seal drops downward naturally when the door is open, i.e., a so-called "raindrop" problem occurs. Japanese Unexamined Patent Publication No. H10-076847 describes that in a section from the roof through a corner to a quarter pillar, the shape of the protrusion is gradually changed with the same extrusion die, thereby achieving both the reduction in the manufacturing costs and the improvement in the appearance while reducing raindrops.

SUMMARY

At the upper end corner of the rear side (i.e., the lock side) of the front door, a phenomenon may occur like the sealing member of Japanese Unexamined Patent Publication No. 2005-280410 in which the pillar-side part and the roof-side part of the sealing member deform in different directions when the door is closed. In an often employed automobile body/door structure, each of the pillar-side part and the roof-side part at this corner includes a seal wall that bends and deforms in the transverse direction of the vehicle. Some cases employ an automobile body/door structure in which the pillar-side part includes a seal wall that bends and deforms in the transverse direction of the vehicle and the roof-side part includes a seal wall that bends and deforms in the vertical direction of the vehicle. In such cases, like the sealing member according to Japanese Unexamined Patent Publication No. 2005-280410, the sealing performance may be obtained by making the pillar-side seal wall and the roof-side seal wall come into elastic contact with the vehicle body. However, in such a case in which a high water pressure acts from outside, e.g., during washing of a vehicle using high-pressure water, the water may flow up, depending on the water pressure, from the pillar side and enters the passenger compartment, resulting in unsatisfactory sealing performance.

Like the sealing member according to Japanese Unexamined Patent Publication No. H9-240278, each of the pillar-side part and the roof-side part may be provided with a seal lip that comes into elastic contact with the vehicle body to further improve the sealing performance.

However, as described above, the pillar-side part and the roof-side part of the sealing member deform differently when the door is closed. Thus, the seal lip of the pillar-side part and the seal lip of the roof-side part cannot be continuous with each other and need to be spaced apart from each other in the transverse direction of the vehicle.

This configuration creates a water passage between the seal lip of the pillar-side part and the seal lip of the roof-side part. In Japanese Unexamined Patent Publication No. H9-240278, a blocking wall that blocks the water passage is formed so as to connect the seal lip of the pillar-side part and the seal lip of the roof-side part.

However, the blocking wall that blocks the water passage shown in Japanese Unexamined Patent Publication No. H9-240278 is connected integrally to both of the seal lip of the roof-side part closer to the inside of the passenger compartment and the seal lip of the pillar-side part closer to the outside of the passenger compartment. This configuration allows the pressing force applied to the seal lip of the roof-side part from the door when the door is closed, to be directly transmitted through the blocking wall to the seal lip of the pillar-side part. As a result, abnormal bending, such as the upper end of the seal lip of the pillar-side part being pushed out of the passenger compartment or conversely drawn into the passenger compartment, may occur. In the end, a gap is formed between part of the seal lip and the outer surface of the vehicle body, which may cause degradation in the appearance or the sealing performance.

Like the sealing member of Japanese Unexamined Patent Publication No. H10-076847, in the case of applying the structure having a protrusion with a length varied by variable extrusion molding in order to avoid the raindrop phenomenon, such a structure as in Japanese Unexamined Patent Publication No. H10-076847, in which the corner is gentle and besides that changes in the direction of bending and deformation of the hollow seal are small, is not particularly problematic.

However, as described above, when the door is closed, the pillar-side part and the roof-side part of the sealing member deform differently. Thus, the seal lip of the pillar-side part and the seal lip of the roof-side part cannot be continuous and need to be spaced apart from each other in the transverse direction of the vehicle.

Accordingly, since a gap is formed between the seal lip of the pillar-side part and the seal lip of the roof-side part, water enters the contact (i.e., a so-called "triangular gap") at the corner between the opening edge of the vehicle body and the hollow seal. That is, the raindrop phenomenon cannot be reduced.

It is therefore an objective of the present disclosure to improve sealing performance without degrading appearance.

In order to achieve the objective, a first aspect of the present disclosure is directed to an automotive door sealing member to be attached to an upper side of a window frame of the automotive door and to a vertical side of the window frame, the vertical side extending downward from a longitudinal end of the upper side. The automotive door sealing member includes: a roof-side part extending in a front-rear direction of a vehicle along the upper side; and a pillar-side part extending in a vertical direction along the vertical side. The roof-side part includes: a roof-side base attached to the upper side; and a roof-side seal wall that is integral with the roof-side base and which comes into elastic contact with a roof of a vehicle body while being pressed and deformed downward by the roof when the automotive door is closed. The pillar-side part includes: a pillar-side base attached to the vertical side; and a pillar-side seal wall that is integral with the pillar-side base and which comes into elastic contact with a pillar of the vehicle body while being pressed and deformed by the pillar toward an outside of a passenger compartment when the automotive door is closed. The roof-side seal wall includes, on an outer surface thereof, a roof-side seal lip that comes into elastic contact with the roof when the automotive door is closed, the roof-side seal lip protruding outward from the roof-side seal wall and extending continuously in the front-rear direction of the vehicle to reach an outer surface of an upper end of the pillar-side seal wall. The pillar-side seal wall includes, on an outer surface thereof, a pillar-side seal lip that comes into elastic contact with the pillar when the automotive door is closed, the pillar-side seal lip protruding outward from the pillar-side seal wall and extending continuously in the vertical direction to reach the outer surface of the roof-side seal wall. A pillar side of the roof-side seal lip and a roof side of the pillar-side seal lip overlap each other when viewed in a transverse direction of the vehicle, and spaced apart from each other in the transverse direction so as not to come into contact with each other when the automotive door is open, and the pillar side of the roof-side seal lip comes into contact with the roof side of the pillar-side seal lip when the automotive door is closed.

With this configuration, when the automotive door is closed, the roof-side seal wall and the roof-side seal lip come into elastic contact with the roof, and the pillar-side seal wall and the pillar-side seal lip come into elastic contact with the pillar. The roof-side seal wall is pressed and deformed downward by the roof, whereas the pillar-side seal wall is pressed and deformed by the pillar toward the outside of the passenger compartment. That is, the roof-side seal wall and the pillar-side seal wall deform differently. Since the roof-side seal lip on the roof-side seal wall and the pillar-side seal lip on the pillar-side wall are spaced apart from each other in the transverse direction of the vehicle so as not to come into contact with each other when the automotive door is open. This configuration allows the roof-side seal lip and the pillar-side seal lip to deform or displace in accordance with the different deformations of the roof-side seal wall and the pillar-side seal wall, which improves the sealing performance.

In addition, the pillar side of the roof-side seal lip and the roof side of the pillar-side seal lip are spaced apart from each other in the transverse direction of the vehicle so as not to come into contact with each other when the automotive door is open. Thus, even if coming into contact with each other when the automotive door is closed, the two sides are not pressed outside or drawn inside. This configuration hardly causes a gap between the roof-side seal lip and the outer surface of the vehicle body, which improves the appearance.

In addition, when the automotive door is closed, the pillar side of the roof-side seal lip comes into contact with the roof side of the pillar-side seal lip, which reduces the entry of the water through a gap between the pillar side of the roof-side seal lip and the roof side of the pillar-side seal lip.

According to a second aspect of the present disclosure, the pillar-side seal lip is closer to an inside of the passenger compartment than the roof-side seal lip is, and the pillar side of the roof-side seal lip curves so as to be closer to the inside of the passenger compartment toward an end of the pillar side.

Specifically, when a high water pressure acts from the outside, water may flow up along the pillar-side seal lip. In this case, the pillar side of the roof-side seal lip curves so as to be closer to the inside of the passenger compartment toward an end of the pillar side. The pillar side of the roof-side seal lip comes into contact with the pillar-side seal lip when the automotive door is closed, which reduces the entry of the water that has flowed up along the pillar-side seal lip into the passenger compartment.

Even if a so-called "triangle gap" is formed at a portion where the seal wall comes into elastic contact with the vehicle body from the roof to the pillar, water does not enter nor remain in the triangular gap because the seal lip continuously abuts on the portion of the triangle gap from the outside the passenger compartment. As a result, no raindrop phenomenon occurs.

According to a third aspect of the present disclosure, when the automotive door is closed, a pillar-side end of the roof-side seal lip comes into contact with a surface of the pillar-side seal lip facing outside the passenger compartment.

With this configuration, when the automotive door is closed, the end of the pillar side of the roof-side seal lip abuts on the surface of the pillar-side seal lip facing outside the passenger compartment, which further improves the sealing performance between the roof-side seal lip and the pillar-side seal lip.

According to a fourth aspect of the present disclosure, an amount of protrusion of the pillar side of the roof-side seal lip from the roof-side seal wall decreases toward an end of the pillar side.

This configuration allows the end of the pillar side of the roof-side seal lip to come into contact with the surface of the pillar-side seal lip facing outside the passenger compartment when the automotive door is closed, without making the end stuck. Thus, the sealing performance between the roof-side seal lip and the pillar-side seal lip further improves.

According to a fifth aspect of the present disclosure, the roof-side seal lip protrudes upward from the roof-side seal wall and is inclined so as to be closer to the outside of the automotive passenger compartment toward an upper end of the roof-side seal lip.

With this configuration, when the automotive door is closed and the roof comes into contact with the roof-side seal lip from the inside of the passenger compartment, the roof-side seal lip deforms so as to be bent down reliably and comes into elastic contact with the roof.

According to the present disclosure, the pillar side of the roof-side seal lip and the roof side of the pillar-side seal lip are spaced apart from each other in the transverse direction of the vehicle so as not to come into contact with each other when the automotive door is open. The pillar side of the roof-side seal lip is formed closer to the roof side of the pillar-side seal lip toward its end, and comes into contact with the roof side of the pillar-side seal lip when the automotive door is closed. This configuration improves the sealing performance without degrading the appearance.

DETAILED DESCRIPTION

An embodiment of the present disclosure will be described in detail with reference to the drawings. Note that the following description of the preferred embodiment is merely illustrative in nature and is not intended to limit the present disclosure and applications or uses of the present disclosure.

Figure 1:
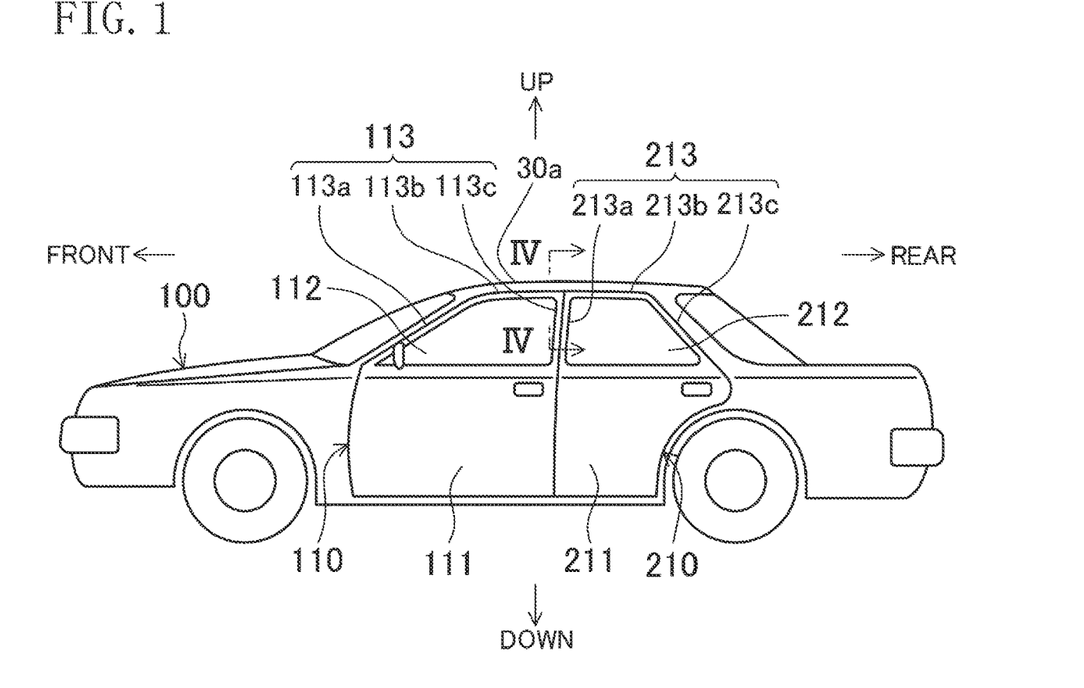
FIG. 1 is a left side view of an automobile including an automotive door sealing member according to an embodiment of present disclosure.

FIG. 1 is a left side view of an automobile 100 including an automotive door sealing member according to an embodiment of the present disclosure. The automobile 100 has a front door 110 and a rear door 210, which are attached to both right and left sides and can be opened and closed. The front door 110 includes a door body 111, a front door glass 112, and a window frame 113 functioning as a sash that holds the front door glass 112. The door body 111 of the front door 110 is attached to a front pillar (not shown) of the vehicle body via hinges (not shown) pivotable about a pivot axis extending in the vertical direction. Like the front door 110, the rear door 210 includes a door body 211, a rear door glass 212, and a window frame 213 functioning as a sash that holds the rear door glass 212. The door body 211 is attached to a center pillar (not shown) via hinges (not shown) pivotable about a pivot axis extending in the vertical direction.

Note that in the description of this embodiment, the front side of a vehicle is simply referred to as the "front," and the rear side of a vehicle is simply referred to as the "rear." In addition, the outside in the transverse direction of the vehicle is referred to as the "outside of the passenger compartment," and the inside in the transverse direction of the vehicle is referred to as the "inside of the passenger compartment."

The window frame 113 of the front door 110 includes a front vertical side 113a, an upper side 113b, and a rear vertical side 113c. The front vertical side 113a of the frame extends upward and rearward from the upper front end of the door body 111. The upper side 113b of the frame extends rearward from the upper end of the front vertical side 113a of the frame. The rear vertical side 113c of the frame extends downward from the rear end (i.e., the longitudinal end) of the upper side 113b of the frame to the upper rear end of the door body 111.

The window frame 213 of the rear door 210 includes a front vertical side 213a, an upper side 213b, and a rear vertical side 213c. The front vertical side 213a of the frame extends upward from the upper front end of the door body 211. The upper side 213b of the frame extends rearward from the upper end of the front vertical side 213a of the frame. The rear vertical side 213c of the frame extends downward from the rear end (i.e., the longitudinal end) of the upper side 213b of the frame to the upper rear end of the door body 211. Like the front door 110, a sealing member (not shown) is attached to this rear door 210.

(Overall Configuration of Front Door Sealing Member)

Figure 2:
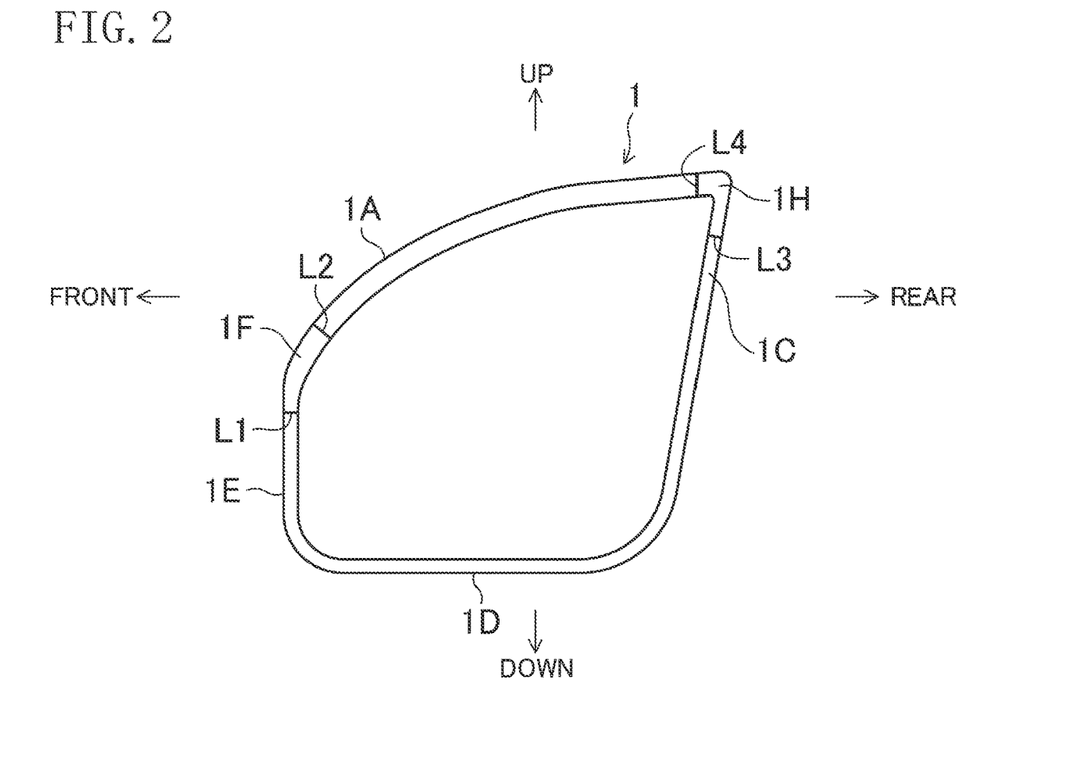
FIG. 2 is a side view of a left front door sealing member as viewed from the outside of a passenger compartment.

FIG. 2 is a view of a left front door sealing member 1 as viewed from the outside of a passenger compartment. The left front door sealing member 1 has an annular shape corresponding to the outer shape of the left front door 110, and includes an upper side extrusion 1A, a rear vertical side extrusion 1C, a lower side extrusion 1D, and a front vertical side extrusion 1E. The upper side extrusion 1A extends in the front-rear direction along the upper side 113b of the frame. The rear vertical side extrusion 1C extends in the vertical direction along the rear vertical side 113c of the frame and extends to the vicinity of the lower end of the door body 111. The lower side extrusion 1D extends in the longitudinal direction along the lower end of the door body 111. The front vertical side extrusion 1E extends in the vertical direction along the front end of the door body 111. The upper side extrusion 1A, the rear vertical side extrusion 1C, the lower side extrusion 1D, and the front vertical side extrusion 1E are obtained through extrusion molding in which an elastic material is extruded through a die (not shown) and molded. The extrusions each have the same cross-sectional shape from one longitudinal end to the other.

In addition, the left front door sealing member 1 includes: a front mold 1F between the front end of the upper side extrusion 1A and the upper end of the front vertical side extrusion 1E; and a rear mold 1H between the rear end of the upper side extrusion 1A and the upper end of the rear vertical side extrusion 1C.

The front door sealing member 1 is attached to the window frame 113 and the door body 111 at a plurality of points separated in the longitudinal direction. Attachment means of the front door sealing member 1 may be clips or a double-sided tape, for example, but are not limited thereto and various attachment means may be used. In this example, the rear mold 1H is attached over the upper side 113b and the rear vertical side 113c of the frame, whereas the upper side extrusion 1A is attached to the upper side 113b of the frame. In addition, the rear vertical side extrusion 1C is attached to the rear vertical side 113c of the frame, whereas the lower side extrusion 1D is attached to the lower end of the door body 111.

A reference numeral L1 denotes the boundary between the front vertical side extrusion 1E and the front mold 1F, whereas a reference numeral L2 denotes the boundary between the upper side extrusion 1A and the front mold 1F. A reference numeral L3 denotes the boundary between the rear vertical side extrusion 1C and the rear mold 1H. A reference numeral L4 denotes the boundary between the upper side extrusion 1A and the rear mold 1H.

The front mold 1F and the rear mold 1H are molded by a mold die (not shown) that can be open and closed, and thus are molded portions. The front mold 1F is obtained by injecting an elastic material into the cavity of the mold die while the mold die holds the front end of the upper side extrusion 1A and the upper end of the front vertical side extrusion 1E. Accordingly, the front mold 1F is integrally molded with the front end of the upper side extrusion 1A and the upper end of the front vertical side extrusion 1E. The rear mold 1H is obtained by injecting an elastic material into the cavity of the mold die while the mold die holds the rear end of the upper side extrusion 1A and the upper end of the rear vertical side extrusion 1C. Accordingly, the rear mold 1H is integrally molded with the upper side extrusion 1A and the rear vertical side extrusion 1C.

The material applicable to the front door sealing member 1 is not particularly limited as long as it is a rubber-like elastic material. If the material is rubber, EPDM sponge rubber is preferred in one embodiment. If the material is a thermoplastic resin, foamed TPO or soft TPO is preferred in one embodiment.

(Detailed Configuration of Left Front Door Sealing Member 1)

Now, an example will be described in which the present disclosure is applied to the rear mold 1H of the left front door sealing member 1. The present disclosure is not limited to the application to this portion and is also applicable to the upper front of a sealing member (not shown) for a rear door, for example.

(Configuration of Rear Vertical Side Extrusion 1C)

Figure 3:
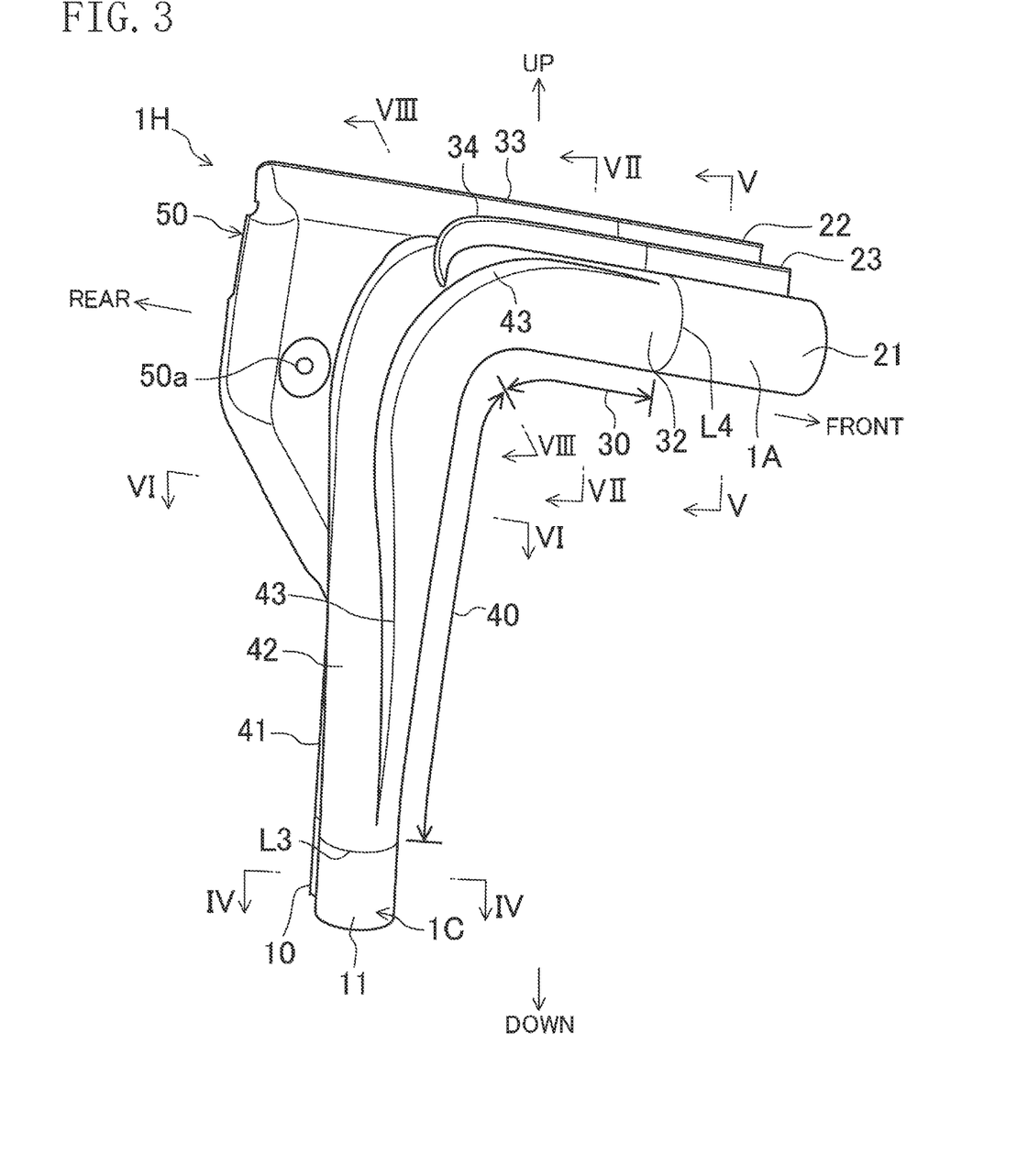
FIG. 3 is a view of the upper rear of the left front door sealing member as viewed from the inside of the passenger compartment.
Figure 4A:
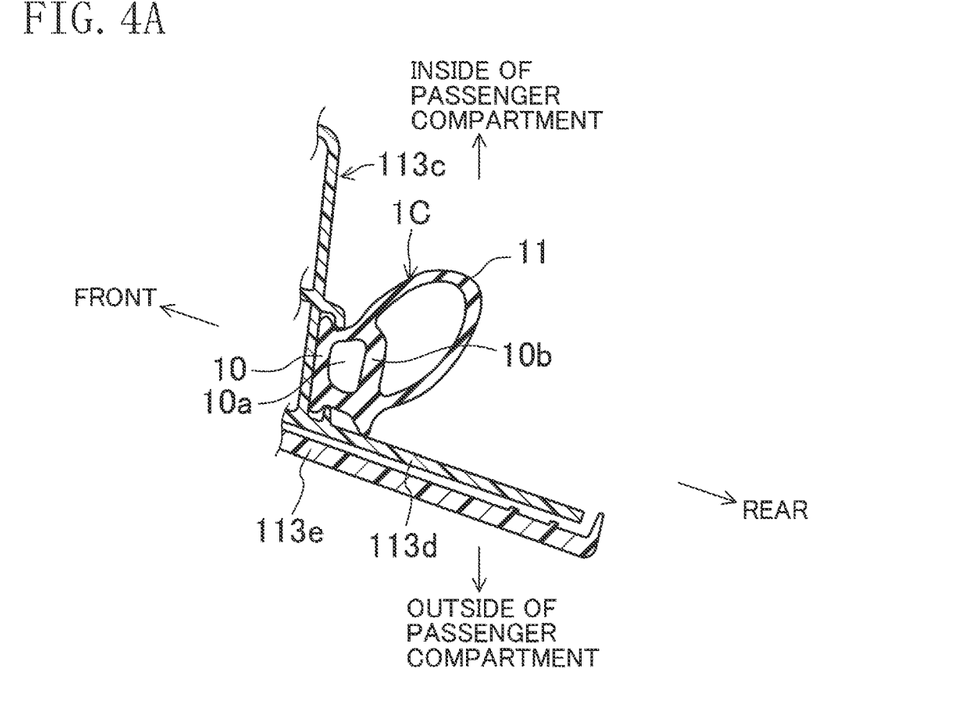
FIG. 4A is a cross-sectional view taken along the line IV-IV in FIG. 3, showing a state of attachment to a front door.
Figure 4B:
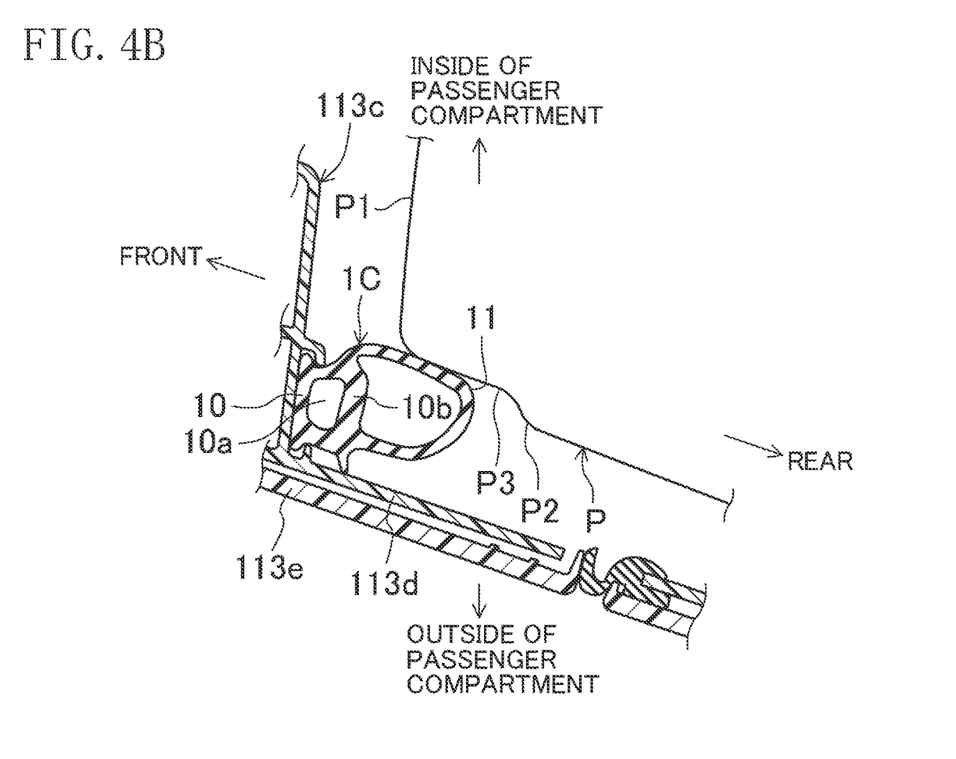
FIG. 4B corresponds to FIG. 4A when the front door is closed.

First, a structure of the rear vertical side extrusion 1C will be described with reference to FIGS. 2, 3, 4A, and 4B. FIGS. 4A and 4B are cross-sectional views taken along line IV-IV of FIG. 3 and show the state in which the extrusion is attached to the front door 110. As shown in FIG. 2, the rear vertical side extrusion 1C extends linearly in the vertical direction. As shown in FIG. 3, the upper end of the rear vertical side extrusion 1C is connected to the lower end of the rear mold 1H.

As shown in FIG. 4A, the rear vertical side extrusion 1C includes a vertical side base 10 and a vertical side seal wall 11. The vertical side base 10 extends along the rear vertical side 113c of the frame and is fixed to the rear vertical side 113c of the frame. The rear vertical side 113c of the frame includes, on the side facing outside the passenger compartment, an extension plate 113d extending rearward. Attached to the extension plate 113d on the side facing outside the passenger compartment is a garnish 113e.

The vertical side seal wall 11 bulges rearward and toward the inside of the passenger compartment from the vertical side base 10. FIG. 4A shows the state in which the front door 110 is open, and the vertical side seal wall 11 is not in elastic contact with the vehicle body. The inside of the vertical side base 10 is hollow and serves as a cavity 10a. The cavity defined by the vertical side seal wall 11 and the cavity 10a of the vertical side base 10 are partitioned by a partition wall 10b located at the rear of the vertical side base 10.

As shown in FIG. 4B, when the front door 110 is closed, the vertical side seal wall 11 comes into elastic contact with the center pillar P of the vehicle body. The center pillar P includes a front plate P1 extending in the transverse direction of the vehicle, and an outer plate P2 extending rearward from the end of the front plate P1 closer to the outside of the passenger compartment. The outer plate P2 has, at its front, a step P3 recessed toward the inside of the passenger compartment. When the front door 110 is closed, the vertical side seal wall 11 of the rear vertical side extrusion 1C comes into elastic contact, from the inside of the passenger compartment, with the outer plate P2 forward of the step P3. Accordingly, the vertical side seal wall 11 is pressed and deforms toward the outside of the passenger compartment, and the tip of the vertical side seal wall 11 in the direction in which the vertical side seal wall bulges deforms to move toward the outside of the passenger compartment and comes into elastic contact with the center pillar P.

(Configuration of Upper Side Extrusion 1A)

Figure 5A:
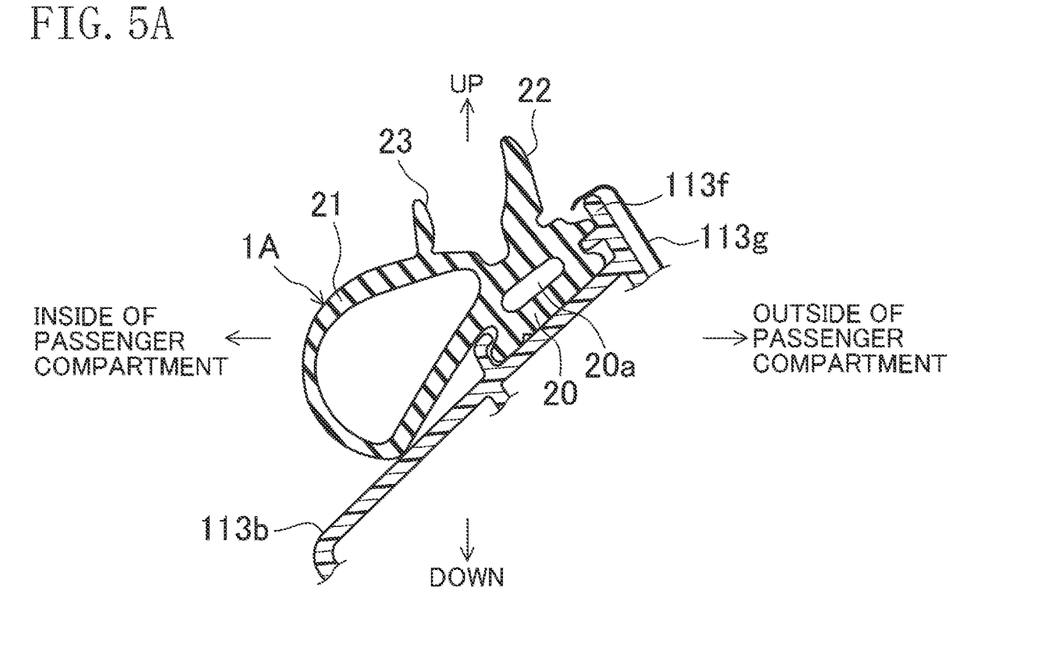
FIG. 5A is a cross-sectional view taken along the line V-V in FIG. 3, showing a state of attachment to a front door.
Figure 5B:
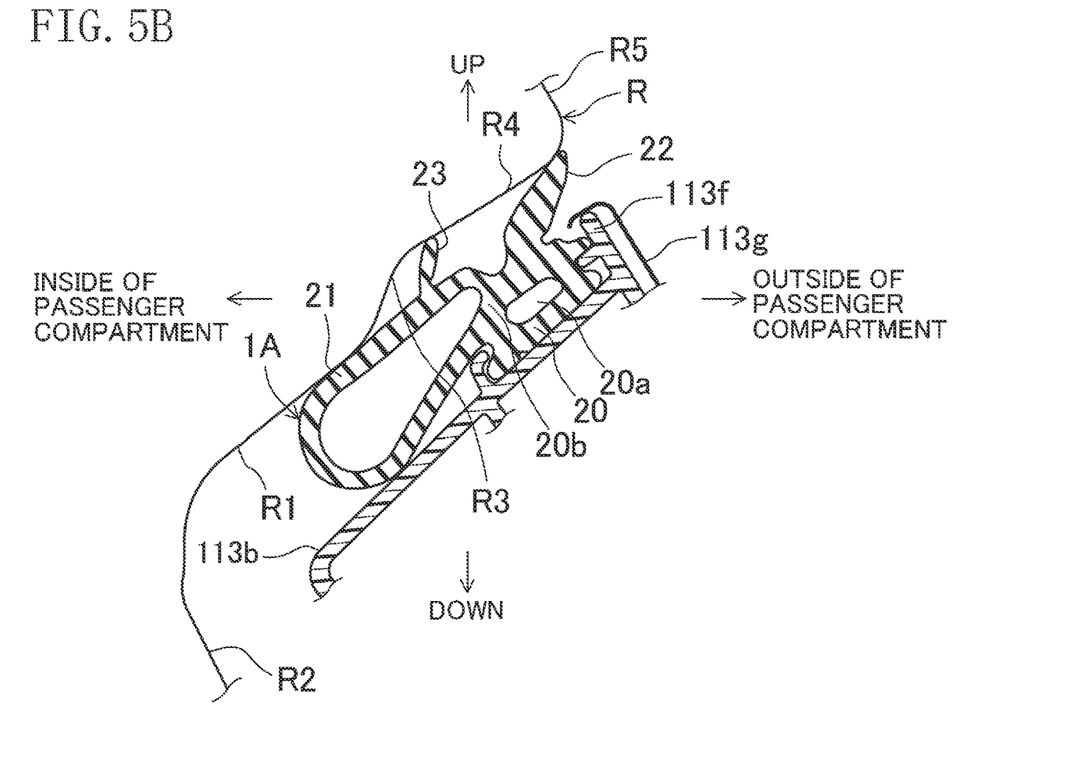
FIG. 5B corresponds to FIG. 5A when the front door is closed.

Next, a structure of the upper side extrusion 1A will be described with reference to FIGS. 2, 3, 5A, and 5B. FIGS. 5A and 5B are cross-sectional views taken along line V-V in FIG. 3 and show the state in which the extrusion is attached to the front door 110. As shown in FIG. 2, the upper side extrusion 1A extends in the front-rear direction and gently curves as a whole along the shape of the upper side 113b of the frame, with its front being lowest. As shown in FIG. 3, the rear end of the upper side extrusion 1A is connected to the front end of the rear mold 1H.

As shown in FIG. 5A, the upper side extrusion 1A includes an upper side base 20 and an upper side seal wall 21. The upper side base 20 extends in the front-rear direction along the upper side 113b of the frame and is fixed to the upper side 113b of the frame. The upper side 113b of the frame includes, on the side facing outside the passenger compartment, an extension plate 113f protruding upward and extending in the front-rear direction. Attached to the extension plate 113f on the side facing outside the passenger compartment is a trim strip 113g.

The inside of the upper side base 20 is hollow and serves as a cavity 20a. The upper side base 20 includes, on its upper surface, an outer seal lip 22 protruding upward and extending in the front-rear direction.

The upper side seal wall 21 is integral with the upper side base 20 on the side toward the passenger compartment and bulges toward the inside of the passenger compartment. FIG. 5A shows the state in which the front door 110 is open, and the upper side seal wall 21 is not in elastic contact with the vehicle body. The cavity defined by the upper side seal wall 21 and the cavity 20a of the upper side base 20 are partitioned by a partition wall 20b of the upper side base 20 on the side toward the inside of the passenger compartment.

The upper side seal wall 21 includes, in a part of its upper surface closer to the outside of the passenger compartment, an inner seal lip 23 protruding upward and extending in the front-rear direction. The inner seal lip 23 is spaced apart from the outer seal lip 22 toward the inside of the passenger compartment and is inclined with its upper end farthest from the inside of the passenger compartment. The inner seal lip 23 is thinner than the outer seal lip 22. The inner seal lip 23 has a smaller vertical length than the outer seal lip 22.

As shown in FIG. 5B, when the front door 110 is closed, the upper side seal wall 21 comes into elastic contact with the roof R of the vehicle body. The roof R includes an inner plate R1 extending in the transverse direction of the vehicle, and an inner plate R2 extending downward from the end of the inner plate R1 closer to the inside of the passenger compartment. The inner plate R1 has a step R3 at a portion outside the passenger compartment. The roof further includes an outer plate R4 extending toward the outside of the passenger compartment from an end of the step R3, and an outer plate R5 extending upward from an end of the outer plate R4.

When the front door 110 is closed, the inner plate R1 and the outer plate R4 are substantially in parallel to the surface of the upper side 113b of the frame to which the sealing member 1 is attached. When the front door 110 is closed, the upper side seal wall 21 of the upper side extrusion 1A comes into elastic contact with the part of the inner plate R1 closer to the outside of the passenger compartment from below. Accordingly, the upper side seal wall 21 is pressed downward and deforms to be squashed between the inner plate R1 and the upper side 113b of the frame and comes into elastic contact with the inner plate R1 and the upper side 113b of the frame.

In addition, when the front door 110 is closed, the outer seal lip 22 and the inner seal lip 23 obliquely come into elastic contact from below with a part of the outer plate R4 closer to the outside of the passenger compartment and with a part of the outer plate R4 closer to the inside of the passenger compartment. Accordingly, the outer seal lip 22 and the inner seal lip 23 are pressed downward, bends, deforms, and comes into elastic contact with the outer plate R4. As a result, a multiple seal structure is obtained.

(Configuration of Rear Mold 1H)

As shown in FIG. 3, the rear mold 1H is formed so as to correspond to the connecting point between the upper side 113b and the rear vertical side 113c of the window frame 113. Specifically, the rear mold 1H includes a roof-side part 30 extending in the front-rear direction along the upper side 113b of the frame, and a pillar-side part 40 extending in the vertical direction along the rear vertical side 113c of the frame. In this embodiment, while the roof-side part 30 has a smaller length than the pillar-side part 40, the lengths are not limited thereto. The roof-side part 30 may have a larger length than the pillar-side part 40 or the same length as the pillar-side part 40.

Figure 6A:
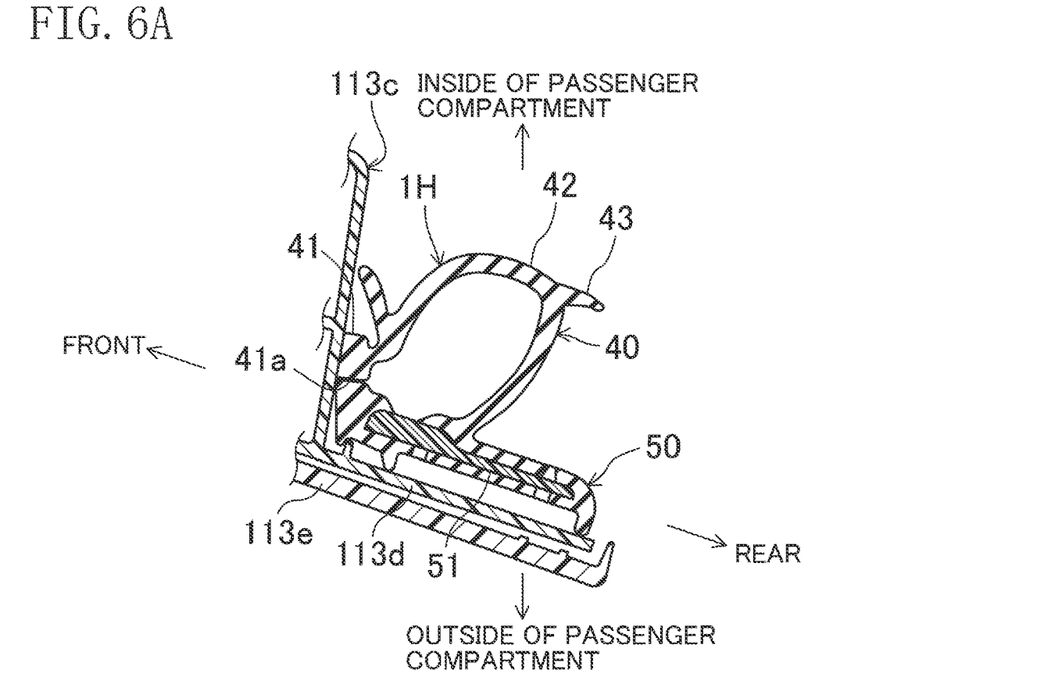
FIG. 6A is a cross-sectional view taken along the line VI-VI in FIG. 3, showing a state of attachment to a front door.
Figure 6B:
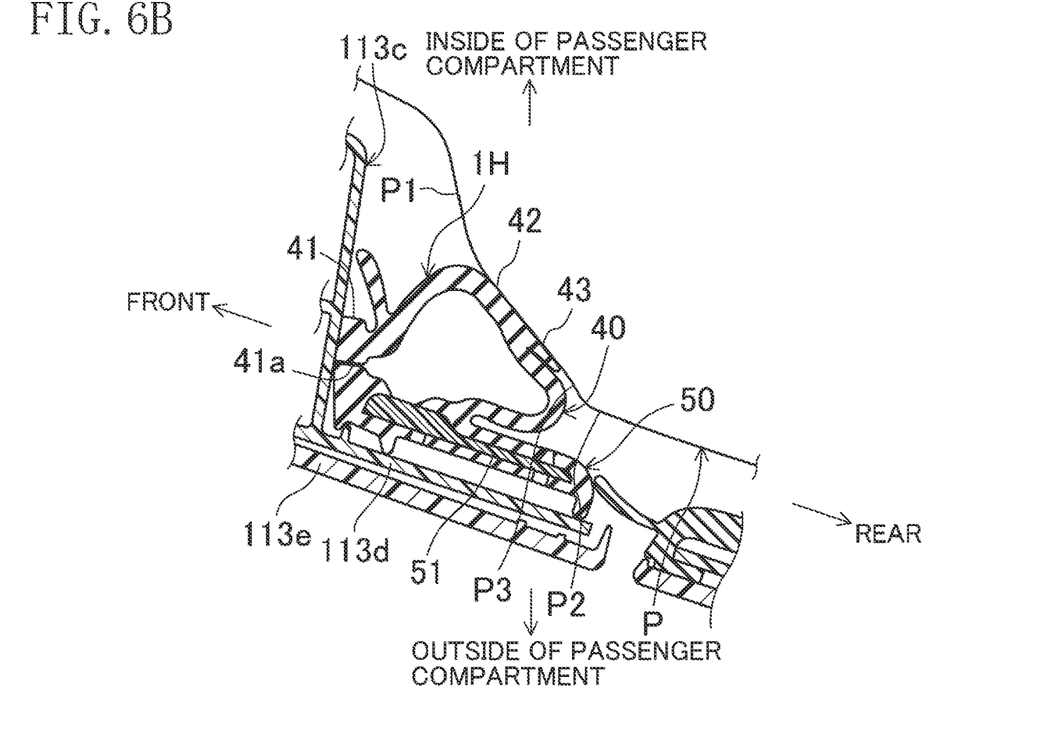
FIG. 6B corresponds to FIG. 6A when the front door is closed.

The rear mold 1H also includes a fixed plate 50 fixed to the window frame 113. The fixed plate 50 extends rearward from the boundary between the roof-side part 30 and the pillar-side part 40 and the vicinity. The fixed plate 50 has, in its vertically intermediate portion, an insertion hole 50a through which a clip or any other means (not shown) for fixing the fixed plate 50 to the window frame 113 is inserted. As shown in FIGS. 6A and 6B, an insert 51 made of, e.g., a hard resin material, is embedded inside the fixed plate 50 to increase the rigidity of the fixed plate 50. The insert 51 may be replaced with an outsert (not shown).

The pillar-side part 40 includes a pillar-side base 41 attached to the rear vertical side 113c of the frame, and a pillar-side seal wall 42 integral with the pillar-side base 41. When the front door 110 is closed, the pillar-side seal wall 42 comes into elastic contact with the pillar P while being pressed and deformed by the pillar P toward the outside of the passenger compartment. The pillar-side base 41 extends along the rear vertical side 113c of the frame, and has a cutout 41a extending in the vertical direction. The cutout 41a is for removing the core (not shown) used when molding the pillar-side seal wall 42. The lower end of the pillar-side base 41 is connected to the upper end of the vertical side base 10 (shown in FIG. 4A) of the rear vertical side extrusion 1C.

The pillar-side seal wall 42 bulges out from the pillar-side base 41 toward the inside of the passenger compartment. The lower end of the pillar-side seal wall 42 is connected to the upper end of the vertical side seal wall 11 (shown in FIG. 4A) of the rear vertical side extrusion 1C. The pillar-side seal wall 42 includes, on its outer surface, a pillar-side seal lip 43 that comes in elastic contact with the pillar P when the front door 110 is closed. The pillar-side seal lip 43 is arranged at a portion toward the inside of the passenger compartment of the pillar-side seal wall 42.

The pillar-side seal lip 43 protrudes outward from the pillar-side seal wall 42 and extends continuously in the vertical direction. The pillar-side seal lip 43 may protrude rearward or toward the inside of the passenger compartment. As shown in FIG. 3, the lower side of the pillar-side seal lip 43 extends to reach the vicinity of the rear vertical side extrusion 1C. The amount of protrusion of the lower side of the pillar-side seal lip 43 gradually decreases toward the lower end.

The roof side, which is the upper part of the pillar-side seal lip 43, extends to reach the outer surface of a roof-side seal wall 32, which will be described later, that is, the upper surface of the rear mold 1H. The amount of protrusion of the roof side of the pillar-side seal lip 43 gradually decreases toward its end.

As shown in FIG. 6B, when the front door 110 is closed, the pillar-side seal wall 42 comes into elastic contact with the step P3 of the center pillar P from the outside of the passenger compartment. Accordingly, the pillar-side seal wall 42 is pressed and deforms toward the outside of the passenger compartment, and the tip of the pillar-side seal wall 42 in the direction in which the pillar-side seal wall bulges deforms to move toward the outside of the passenger compartment and comes into elastic contact with the center pillar P. In addition, the pillar-side seal lip 43 also comes into elastic contact with the step P3 and deforms to be bent down toward the outside of the passenger compartment.

Figure 7A:
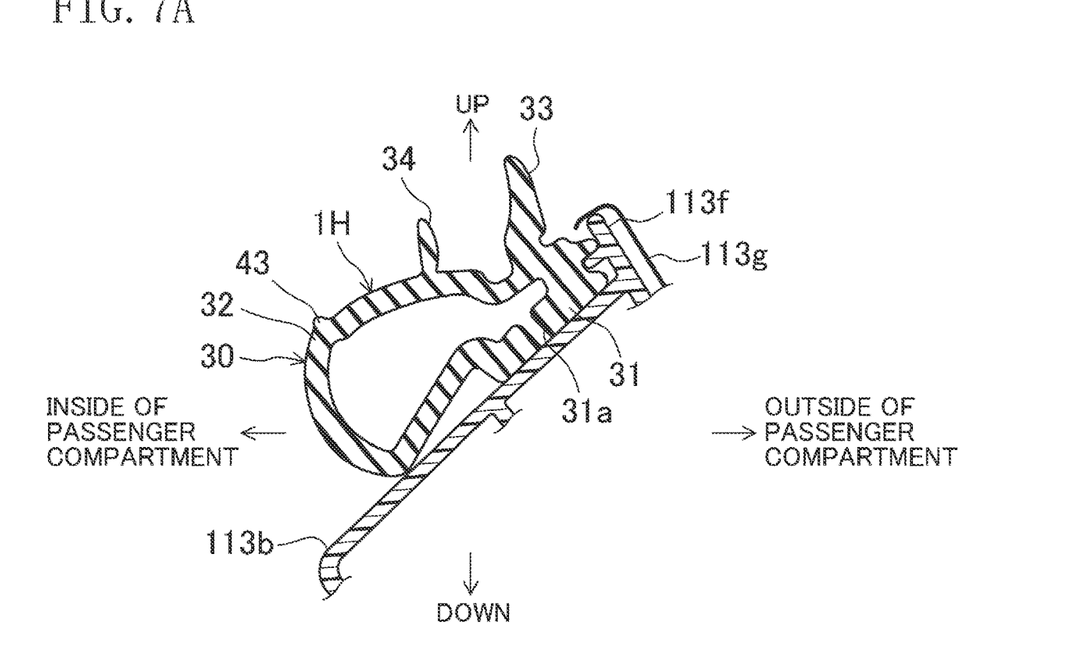
FIG. 7A is a cross-sectional view taken along the line VII-VII in FIG. 3, showing a state of attachment to a front door.

As shown in FIG. 7A, the roof-side part 30 includes a roof-side base 31 attached to the upper side 113b of the frame, and the roof-side seal wall 32 integral with the roof-side base 31. When the front door 110 is closed, the roof-side seal wall 32 comes into elastic contact with the roof R while being pressed and deformed downward by the roof R. The roof-side base 31 extends in the front-rear direction along the upper side 113b of the frame. The roof-side base 31 has a cutout 31a extending in the front-rear direction. The cutout 31a is continuous with the cutout 41a of the pillar-side part 40. The cutout 31a is for removing the core (not shown) used when molding the roof-side seal wall 32. The front end of the roof-side base 31 is connected to the rear end of the upper side base 20 (shown in FIG. 5A) of the upper side extrusion 1A.

The roof-side seal wall 32 bulges out from the roof-side base 31 toward the inside of the passenger compartment. The front end of the roof-side seal wall 32 is connected to the rear end of the upper side seal wall 21 (shown in FIG. 5A) of the upper side extrusion 1A. The roof-side seal wall 32 includes, on its outer surface, an outer seal lip 33 that comes in elastic contact with the roof R when the front door 110 is closed. The outer seal lip 33 protrudes upward and extends in the front-rear direction. The front end of the outer seal lip 33 is connected to the rear end of the outer seal lip 22 (shown in FIG. 5A) of the upper side extrusion 1A. As shown in FIG. 3, the rear end of the outer seal lip 33 continuously extends to the upper part of the fixed plate 50.

As shown in FIG. 7A, the roof-side seal wall 32 includes, on its outer surface, a roof-side seal lip 34 that comes in elastic contact with the roof R when the front door 110 is closed. The roof-side seal lip 34 is arranged at the roof-side seal wall 32 closer to the outside the passenger compartment.

The roof-side seal lip 34 protrudes outward from the roof-side seal wall 32 and extends continuously in the front-rear direction. The roof-side seal lip 34 protrudes upward and is inclined with its upper end farthest from the inside of the passenger compartment. The front end of the roof-side seal lip 34 is connected to the rear end of the inner seal lip 23 (shown in FIG. 5A) of the upper side extrusion 1A.

As shown in FIG. 3, the pillar side, which is the rear part of the roof-side seal lip 34, extends to reach the outer surface of the pillar-side seal wall 42. The amount of protrusion of the pillar side of the roof-side seal lip 34 gradually decreases toward its end.

Figure 8A:
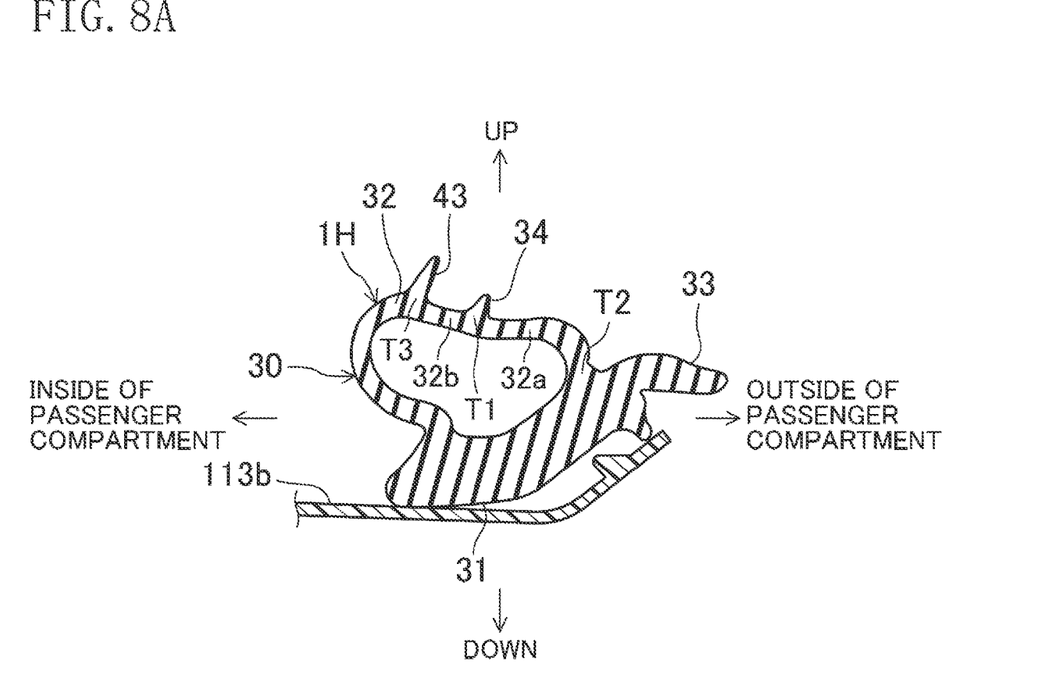
FIG. 8A is a cross-sectional view taken along the line VIII-VIII in FIG. 3, showing a state of attachment to a front door.

The pillar side of the roof-side seal lip 34 and the roof side of the pillar-side seal lip 43 overlap each other when viewed in the transverse direction of the vehicle. As shown in FIG. 8A, the pillar side, which is a rear end part, of the roof-side seal lip 34 and the roof side of the pillar-side seal lip 43 are spaced apart from each other in the transverse direction of the vehicle so as not to come into contact with each other when the front door 110 is open. In a state in which the front door 110 is open, the pillar-side seal lip 43 is closer to the inside of the passenger compartment than the roof-side seal lip 34 is.

As shown in FIG. 3, the pillar side of the roof-side seal lip 34 is formed closer to the roof side of the pillar-side seal lip 43 toward its end. Specifically, the pillar side of the roof-side seal lip 34 curves so as to be closer to the inside of the passenger compartment toward its rear end. The amount of protrusion of the pillar side of the roof-side seal lip 34 from the roof-side seal wall 32 decreases toward its rear end.

Figure 8B:
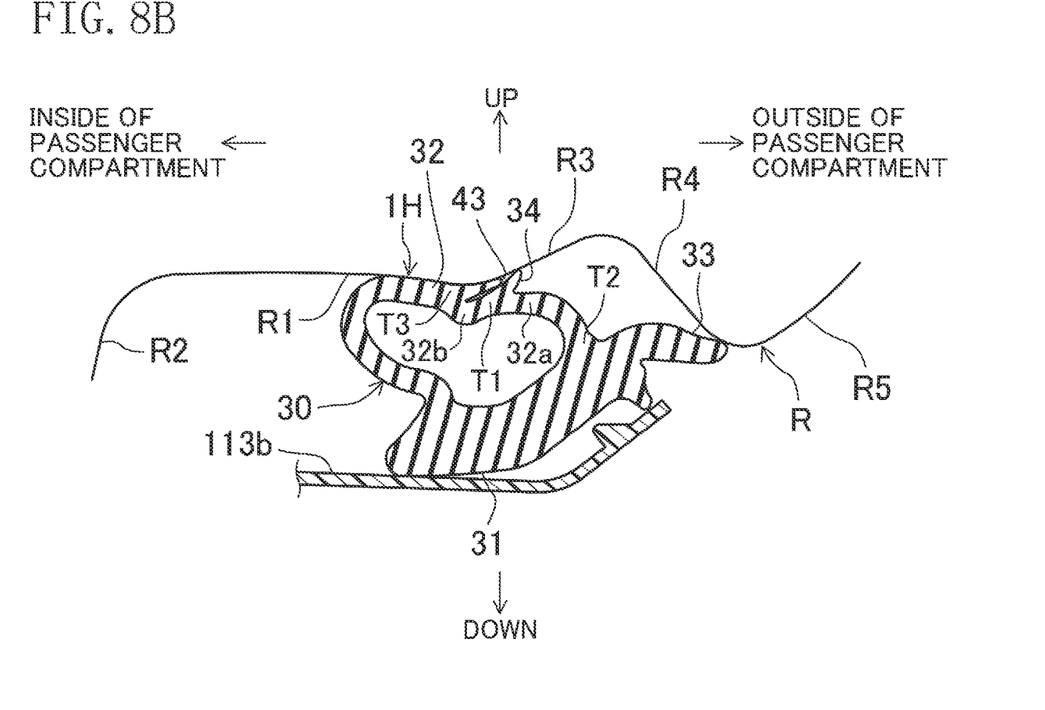
FIG. 8B corresponds to FIG. 8A when the front door is closed.

As shown in FIG. 8B, when the front door 110 is closed, the roof-side seal wall 32 comes into elastic contact with the inner plate R1 of the roof R from below. Accordingly, the roof-side seal wall 32 is pressed and deforms downward to come into elastic contact with the inner plate R1 of the roof R. In addition, the pillar-side seal lip 43 comes into elastic contact with the inner plate R1 and the step R3 and deforms to be bent down toward the outside of the passenger compartment.

On the other hand, when the front door 110 is closed, the pillar side of the roof-side seal lip 34 deforms to be bent down toward the outside of the passenger compartment. However, the deformation amount of the pillar side of the roof-side seal lip 34 is smaller than the deformation amount of the roof side of the pillar-side seal lip 43.

The reasons are as follows.

(1) The amount of protrusion of the pillar side of the roof-side seal lip 34 from the roof-side seal wall 32 decreases toward its rear end.

(2) The pillar side of the roof-side seal lip 34 has a lip shape (both of the tip and the root) that curves so as to be closer to the inside of the passenger compartment toward its rear end. (That is, the roof-side seal wall 32 is not parallel, but has an acute angle, with respect to the direction in which the roof-side seal wall 32 bends and deforms in the transverse direction of the vehicle.)

In view of these two points, it can be said that the pillar side of the roof-side seal lip 34 has higher rigidity than the roof side of the pillar-side seal lip 43. Accordingly, when the front door 110 is closed, a region 32a of the roof-side seal wall 32, the region 32a extending from the root T1 of the roof-side seal lip 34 to the root T2 of the roof-side base, curves and deforms upward; and a region 32b of the roof-side seal wall 32, the region 32b extending from the roof-side root T3 of the pillar-side seal lip 43 to the pillar-side root T1 of the roof-side seal lip 34, curves and deforms downward. As a result, the pillar side of the roof-side seal lip 34 comes into contact with the roof side of the pillar-side seal lip 43 (when the front door 110 is closed). This configuration is achieved by, for example, setting of the amount of protrusion of the roof-side seal lip 34 from the roof-side seal wall 32 or setting of the distance between the roof-side seal lip 34 and the pillar-side seal lip 43 in the transverse direction of the vehicle.

In this embodiment, the pillar side of the roof-side seal lip 34 curves so as to be closer to the pillar-side seal lip 43. Thus, when the front door 110 is open, the pillar-side end of the roof-side seal lip 34 faces the surface of the pillar-side seal lip 43 facing outside the passenger compartment. When the front door 110 is closed from this state, the pillar-side end of the roof-side seal lip 34 comes into contact with the surface of the pillar-side seal lip 43 facing outside the passenger compartment. Accordingly, there is almost no gap between the pillar-side end of the roof-side seal lip 34 and the pillar-side seal lip 43, which reduces the entry of water.

Advantages of Embodiment

Figure 7B:
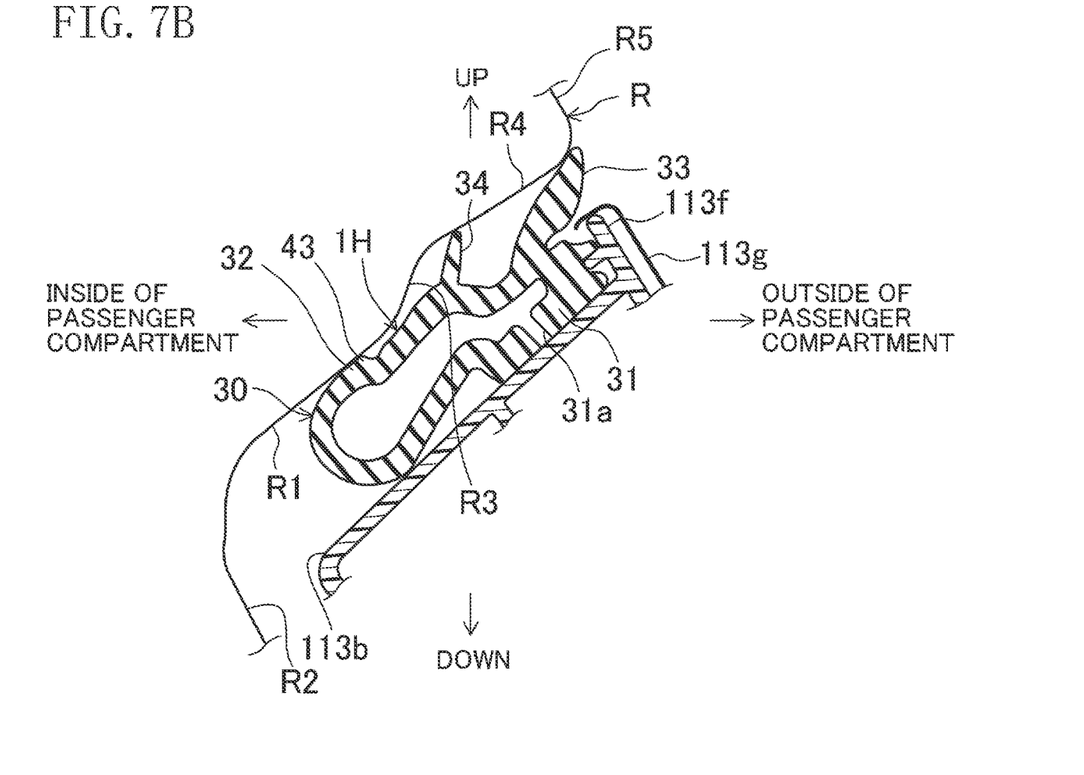
FIG. 7B corresponds to FIG. 7A when the front door is closed.

As described above, when the front door 110 is closed, the roof-side seal wall 32 and the roof-side seal lip 34 come into elastic contact with the roof R as shown in FIG. 7B. In addition, as shown in FIG. 6B, the pillar-side seal wall 42 and the pillar-side seal lip 43 come into elastic contact with the pillar P. The roof-side seal wall 32 is pressed and deforms downward from the roof R, whereas the pillar-side seal wall 42 is pressed and deforms toward the outside of the passenger compartment from the pillar P. That is, the roof-side seal wall 32 and the pillar-side seal wall 42 deform differently.

Since the roof-side seal lip 34 on the roof-side seal wall 32 and the pillar-side seal lip 43 on the pillar-side seal wall 42 are spaced apart from each other in the transverse direction of the vehicle so as not to come into contact with each other when the front door 110 is open. This configuration allows the roof-side seal lip 34 and the pillar-side seal lip 43 to deform or displace in accordance with the different deformations of the roof-side seal wall 32 and the pillar-side seal wall 42, which improves the sealing performance.

In addition, since the pillar side of the roof-side seal lip 34 and the roof side of the pillar-side seal lip 43 are spaced apart from each other in the transverse direction of the vehicle so as not to come into contact with each other when the front door 110 is open. Thus, even if coming into contact with each other when the front door 110 is closed, the two sides are not pressed outside or drawn inside. This configuration hardly causes a gap between the roof-side seal lip 34 and the outer surface of the vehicle body, which improves the appearance.

In addition, the pillar side of the roof-side seal lip 34 comes into contact with the roof side of the pillar-side seal lip 43 when the front door 110 is closed. This configuration reduces the entry of the water through a gap between the pillar side of the roof-side seal lip 34 and the roof side of the pillar-side seal lip 43.

The embodiment described above is merely illustrative in every respect and shall not be construed in a limited manner. Any modification and change equivalent to the scope of claims fall within the scope of the present disclosure.

As described above, the automotive door sealing member according to the present disclosure can be used, for example, to seal a gap between the door attached to a side of an automobile and a vehicle body.

What is claimed is:

1. An automotive door sealing member to be attached to an upper side of a window frame of the automotive door and to a vertical side of the window frame, the vertical side extending downward from a longitudinal end of the upper side, the automotive door sealing member comprising:
   a roof-side part extending in a front-rear direction of a vehicle along the upper side; and
   a pillar-side part extending in a vertical direction along the vertical side, wherein
   the roof-side part includes: a roof-side base attached to the upper side; and a roof-side seal wall that is integral with the roof-side base and which comes into elastic contact with a roof of a vehicle body while being pressed and deformed downward by the roof when the automotive door is closed,
   the pillar-side part includes: a pillar-side base attached to the vertical side; and a pillar-side seal wall that is integral with the pillar-side base and which comes into elastic contact with a pillar of the vehicle body while being pressed and deformed by the pillar toward an outside of a passenger compartment when the automotive door is closed,
   the roof-side seal wall includes, on an outer surface thereof, a roof-side seal lip that comes into elastic contact with the roof when the automotive door is closed, the roof-side seal lip protruding outward from the roof-side seal wall and extending continuously in the front-rear direction of the vehicle to reach an outer surface of an upper end of the pillar-side seal wall,
   the pillar-side seal wall includes, on an outer surface thereof, a pillar-side seal lip that comes into elastic contact with the pillar when the automotive door is closed, the pillar-side seal lip protruding outward from the pillar-side seal wall and extending continuously in the vertical direction to reach the outer surface of the roof-side seal wall,
   a pillar side of the roof-side seal lip and a roof side of the pillar-side seal lip overlap each other when viewed in a transverse direction of the vehicle, and spaced apart from each other in the transverse direction so as not to come into contact with each other when the automotive door is open, and the pillar side of the roof-side seal lip comes into contact with the roof side of the pillar-side seal lip when the automotive door is closed, the pillar-side seal lip is closer to an inside of the passenger compartment than the roof-side seal lip is, and
   the pillar side of the roof-side seal lip curves so as to be closer to the inside of the passenger compartment toward an end of the pillar side of the roof-side seal lip.

2. The automotive door sealing member of claim 1, wherein
   when the automotive door is closed, the end of the pillar side of the roof-side seal lip comes into contact with a surface of the pillar-side seal lip facing outside the passenger compartment.

3. The automotive door sealing member of claim 1, wherein
   the roof-side seal lip protrudes upward from the roof-side seal wall and is inclined so as to be closer to the outside of the automotive passenger compartment toward an upper end of the roof-side seal lip.

4. An automotive door sealing member to be attached to an upper side of a window frame of the automotive door and to a vertical side of the window frame, the vertical side extending downward from a longitudinal end of the upper side, the automotive door sealing member comprising:
   a roof-side part extending in a front-rear direction of a vehicle along the upper side; and
   a pillar-side part extending in a vertical direction along the vertical side, wherein the roof-side part includes: a roof-side base attached to the upper side; and a roof-side seal wall that is integral with the roof-side base and which comes into elastic contact with a roof of a vehicle body while being pressed and deformed downward by the roof when the automotive door is closed,
   the pillar-side part includes: a pillar-side base attached to the vertical side; and a pillar-side seal wall that is integral with the pillar-side base and which comes into elastic contact with a pillar of the vehicle body while being pressed and deformed by the pillar toward an outside of a passenger compartment when the automotive door is closed,
   the roof-side seal wall includes, on an outer surface thereof, a roof-side seal lip that comes into elastic contact with the roof when the automotive door is closed, the roof-side seal lip protruding outward from the roof-side seal wall and extending continuously in the front-rear direction of the vehicle to reach an outer surface of an upper end of the pillar-side seal wall,
   the pillar-side seal wall includes, on an outer surface thereof, a pillar-side seal lip that comes into elastic contact with the pillar when the automotive door is closed, the pillar-side seal lip protruding outward from the pillar-side seal wall and extending continuously in the vertical direction to reach the outer surface of the roof-side seal wall,
   a pillar side of the roof-side seal lip and a roof side of the pillar-side seal lip overlap each other when viewed in a transverse direction of the vehicle, and spaced apart from each other in the transverse direction so as not to come into contact with each other when the automotive door is open, and the pillar side of the roof-side seal lip comes into contact with the roof side of the pillar-side seal lip when the automotive door is closed, and
   the pillar side of the roof-side seal lip protrudes from the roof-side seal wall by an amount, and the amount of protrusion of the pillar side of the roof-side seal lip decreases toward an end of the pillar side of the roof-side seal lip.

5. The automotive door sealing member of claim 4, wherein
when the automotive door is closed, the end of the pillar side of the roof-side seal lip comes into contact with a surface of the pillar-side seal lip facing outside the passenger compartment.

6. The automotive door sealing member of claim 4, wherein
the roof-side seal lip protrudes upward from the roof-side seal wall and is inclined so as to be closer to the outside of the automotive passenger compartment toward an upper end of the roof-side seal lip.

* * * * *